United States Patent
Cheng et al.

(10) Patent No.: US 9,067,552 B1
(45) Date of Patent: Jun. 30, 2015

(54) ADAPTIVE ENERGY ABSORBER FOR A VEHICLE

(71) Applicant: Ford Global Technologies, LLC, Dearborn, MI (US)

(72) Inventors: James Chih Cheng, Troy, MI (US); Mohammed Omar Faruque, Ann Arbor, MI (US); Iskander Farooq, Novi, MI (US); Sudip Sankar Bhattacharjee, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/458,510

(22) Filed: Aug. 13, 2014

(51) Int. Cl.
*B60R 19/44* (2006.01)

(52) U.S. Cl.
CPC ..................................... *B60R 19/44* (2013.01)

(58) Field of Classification Search
CPC .................................................... B60R 19/44
See application file for complete search history.

(56) References Cited

U.S. PATENT DOCUMENTS

| | | |
|---|---|---|
| 6,893,064 B2 | 5/2005 | Satou |
| 7,597,383 B2 | 10/2009 | Itou et al. |
| 7,866,716 B2 | 1/2011 | Perucca et al. |
| 7,954,864 B2 | 6/2011 | Frederick et al. |
| 8,646,552 B2 | 2/2014 | Evans et al. |
| 2005/0082851 A1* | 4/2005 | Nakanishi .................... 293/118 |
| 2013/0140850 A1 | 6/2013 | Tyan et al. |
| 2014/0062107 A1 | 3/2014 | Kim et al. |

* cited by examiner

*Primary Examiner* — Lori L Lyjak
(74) *Attorney, Agent, or Firm* — Frank A. MacKenzie; Bejin Bieneman PLC

(57) ABSTRACT

An energy absorption system, comprises a vehicle bumper. An energy absorption member is attached to the bumper, the energy absorption member comprising a first piece and a second piece. A linear actuator connects the energy absorption member to the bumper. The actuator may be actuated based on the speed information from the onboard vehicle communication network.

16 Claims, 5 Drawing Sheets

ADAPTIVE ENERGY ABSORBER FOR A VEHICLE

BACKGROUND

Requirements for protecting a vehicle front end may conflict for different crash scenarios. For example, low-speed damageability (LSD) and pedestrian protection requirements may differ. LSD requirements generally dictate that no or minimal damage occurs to various vehicle front end components, e.g., side rails, radiator supports, doors, fenders, hood, hinges, headlamps, etc., at low speeds, e.g., speeds below 15 kilometers per hour (KPH). Accordingly, LSD scenarios generally require that approximately 80 percent of impact energy from a collision be absorbed by a vehicle bumper at speeds of 15 KPH or less. In contrast, pedestrian protection requirements are generally designed to limit pedestrian leg injuries to certain knee shear and bending moment targets at relatively higher speeds, e.g., around 40 kilometers per hour. Accordingly, relative to one another, LSD scenarios generally require a stiff bumper system, whereas pedestrian protection scenarios generally require a softer bumper mechanism. Unfortunately, current vehicle bumper systems are not adaptable to meet these different requirements. There is a need for a vehicle bumper system that can adapt to the respective requirements of an LSD scenario and a pedestrian protection scenario.

DRAWINGS

DETAILED DESCRIPTION

Figure 1:
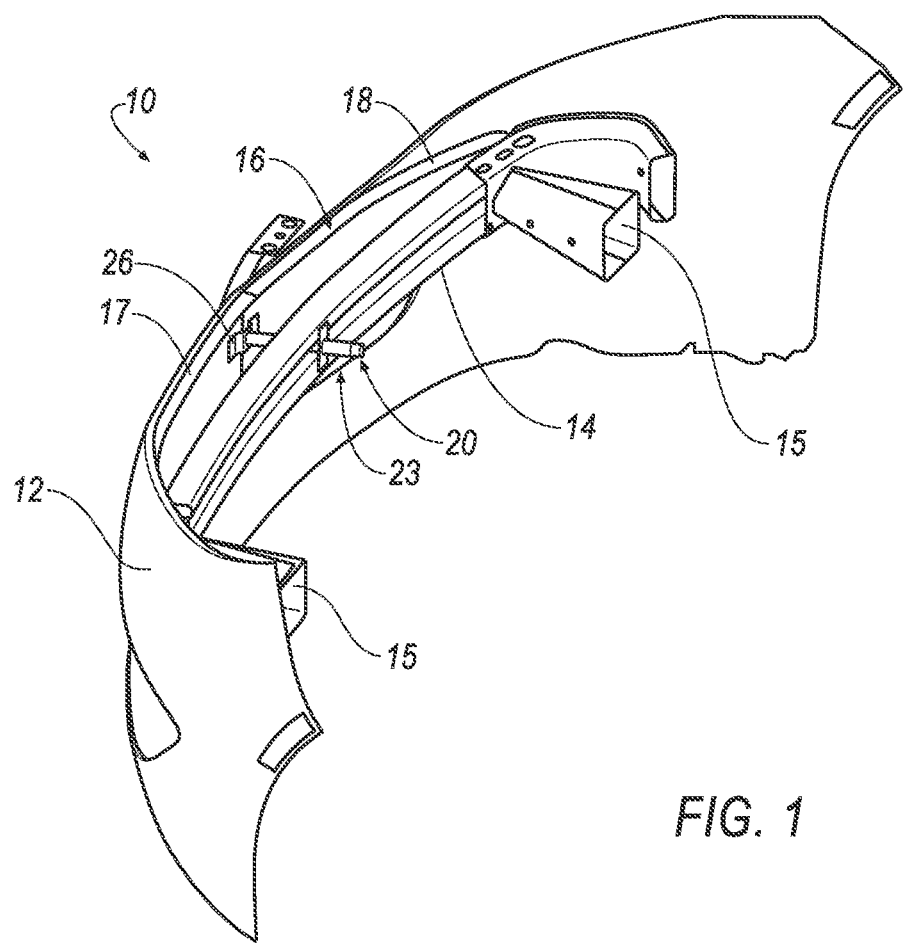
FIG. 1 is a perspective view of an example of an adaptive energy absorber system and a vehicle front fascia.
Figure 2:
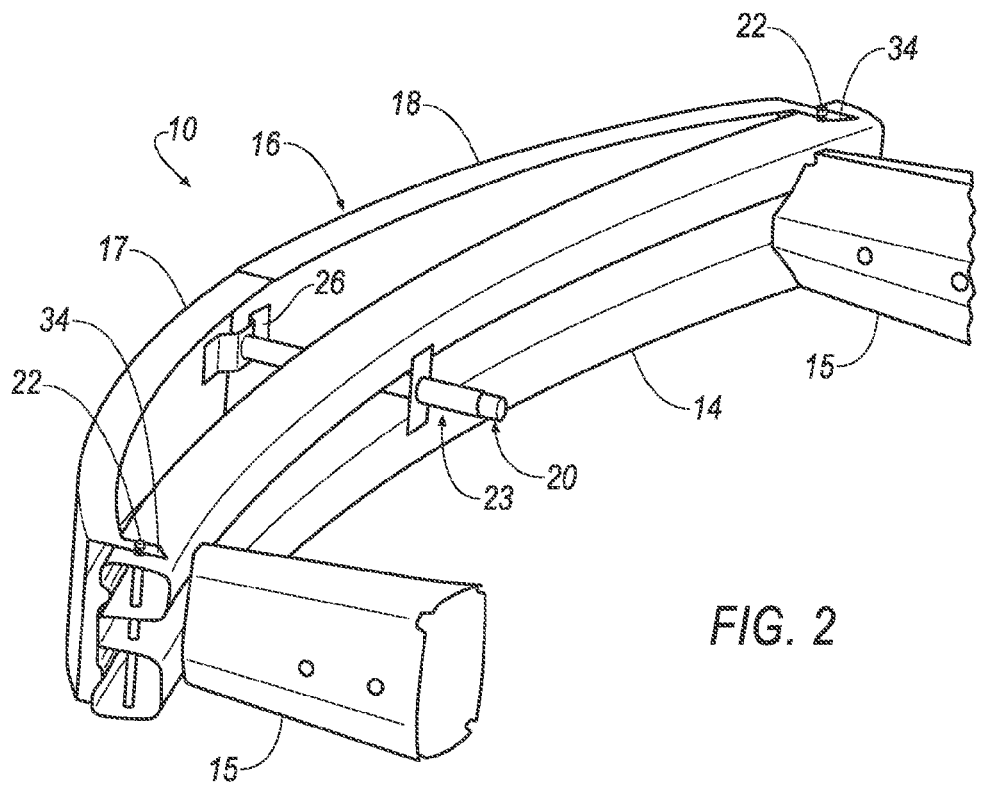
FIG. 2 is a perspective view of an example of an adaptive energy absorber system in a first state.
Figure 3:
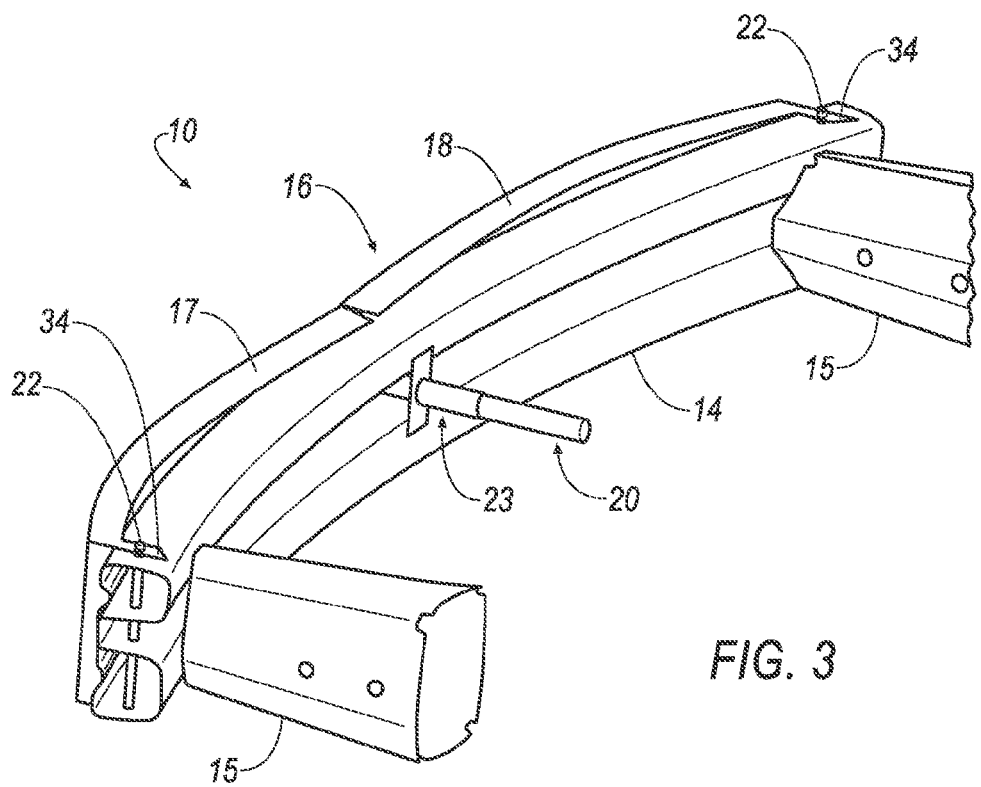
FIG. 3 is a perspective view of the adaptive energy absorber system of FIG. 1 in a second state.

Disclosed herein and illustrated in the various figures is an adaptive energy absorber system 10 for a vehicle. As seen in FIG. 1, a vehicle front fascia 12, which is shown for completeness and context, but which is not necessary to the energy absorber system 10, may cover a bumper 14 and an energy absorber 16 affixed to the bumper 14. The fascia 12 could be affixed to the energy absorber 16 with a low density foam or the like (not shown) to allow the fascia 12 to maintain a desired shape. FIG. 2 shows the system 10, including an energy absorber 16, in a first state, e.g., in a position to accommodate low-speed damageability requirements. FIG. 3 shows the system 10, including an energy absorber 16, in a second state, e.g., in a position to accommodate pedestrian protection requirements, i.e., at higher speeds. In the first state, the system 10 is deployed to absorb a greater amount of impact energy than when deployed in the second state.

With reference to FIGS. 1-3, the bumper 14 may be a conventional vehicle bumper, e.g., formed of steel or the like. The energy absorber 16 may be any one of a variety of materials, depending on energy absorption requirements, such as an elastomeric plastic, sheet metal, etc. Moreover, the energy absorber 16 generally includes a first piece 17 and a second piece 18 made of such materials. The pieces 17, 18 may be secured to one another via a variety of mechanisms, such as an adhesive and/or friction. The bumper 14 may further have affixed thereto side members, e.g., crash cans, 15. The bumper 14, e.g., via the crash cans 15, may be attached to a vehicle front end (not shown) in a conventional manner.

First and second ends of the energy absorber 16, e.g., a first end being an end of the first piece 17, and a second end being an end of the second piece 18, are attached to respective first and second ends of the bumper 14. For example, pivot pins 22 may be inserted through respective securing tabs 34 in the first and second ends of the energy absorber 16, and through openings provided in the bumper 14, thereby pivotably securing each of the pieces 17, 18 to the bumper 14.

A linear actuator 20, e.g., a screw-type linear actuator or the like, is provided to move the energy absorber 16 with respect to the bumper 14, e.g., to move the energy absorber 16 from a first state to a second state as described above. That is, the actuator 20 may be used to extend the energy absorber 16 away from the bumper 14 to achieve the first state, i.e., deployment for an LSD scenario. Further, the actuator 20 may be used to pull the energy absorber 16 toward the bumper 14 to achieve the second state, i.e., deployment for a pedestrian protection scenario. The actuator 20 includes a bumper securing fixture 23 that may be welded, adhered, or otherwise secured to the bumper 14. Further, the actuator 20 is connected to the energy absorber 16, generally to both pieces 17, 18, by a flexing mechanism that allows the actuator 20 to accommodate flexing and movement of the pieces 17, 18 with respect to each other and to the bumper 14. In the present example, the flexing mechanism is a hinged head bracket 26. The bracket 26 may be secured to the energy absorber 16 with an adhesive or other securing mechanism.

Figure 4:
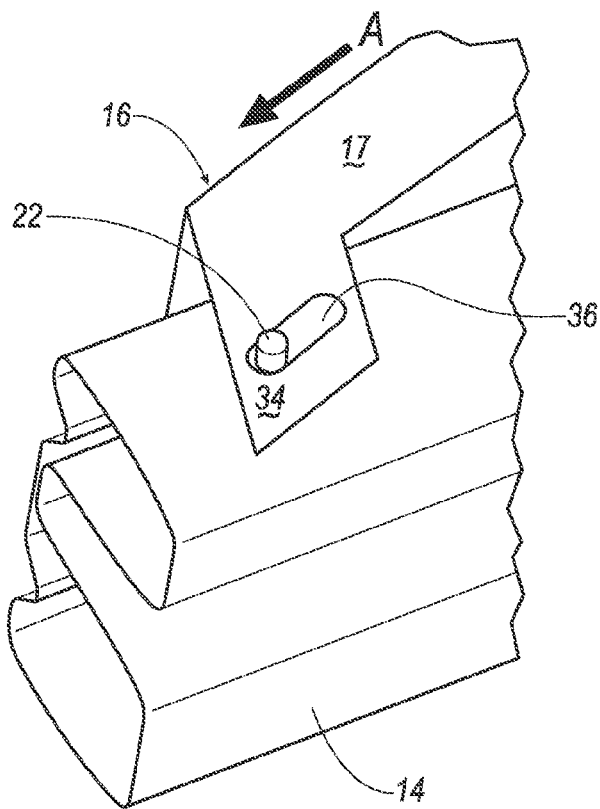
FIG. 4 is a perspective view of an end portion of the adaptive energy absorber system of FIG. 1 in the first state.

As seen in FIG. 4, a piece 17 of the energy absorber 16 may include tabs 34 having an opening 36 therein to accommodate the pin 22. Note that, although one tab 34, and opening 36, is shown extending from a top side of the piece 17 in FIG. 4, it should be understood that a second corresponding tab 34, including a second opening 36 in the second tab 34, generally likewise extends from a bottom side of the piece 17, the second opening 36 also accommodating the pin 22. The opening 36 may be elongate, e.g., having a width slightly larger than a diameter of the pin 22, and having a length some multiple, e.g., 3 to 4 times, the diameter of the pin 22. The purpose of providing the opening 36 with an elongate shape is to allow the piece 17 to pivot about the pin 22, and to move in a longitudinal direction with respect to the bumper 14, when the energy absorber 16 is transitioned from a first state to a second state (or some state in between).

For example, FIG. 4 shows the energy absorber 16, including the piece 17, in a first state corresponding to FIG. 2. When the linear actuator 20 is actuated to move the energy absorber 16 in a direction toward the bumper 14, the energy absorber 16 transitions to the second state, corresponding to FIG. 3. In this transition, the piece 17 moves in a direction indicated by the arrow A.

Figure 5:
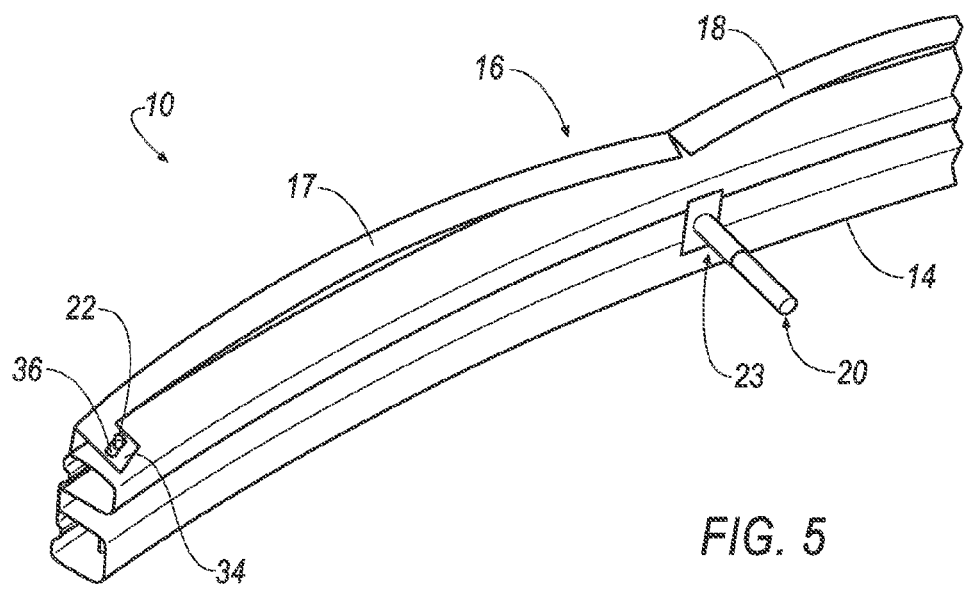
FIG. 5 is a perspective view of an end portion of the adaptive energy absorber system of FIG. 1 in the second state.

FIG. 5 shows the energy absorber 16, including the piece 17 in a second state corresponding to FIG. 3, e.g., when the actuator has moved the energy absorber 16 from the first state to the second state. Conversely, the actuator 20 could be used to move the energy absorber 16 in the first state away from the bumper 14 to transition to the second state. Although not shown in detailed diagrams such as FIGS. 4 and 5, it should be understood that a second piece 18 of an energy absorber 16 may likewise include tabs 34 having openings 36 through which a pin 22 is inserted. Accordingly, in the manner just described, the pieces 17, 18 included in the energy absorber 16 may be movably, longitudinally and/or pivotably with respect to the bumper 14, secured to the bumper 14.

Figure 6:
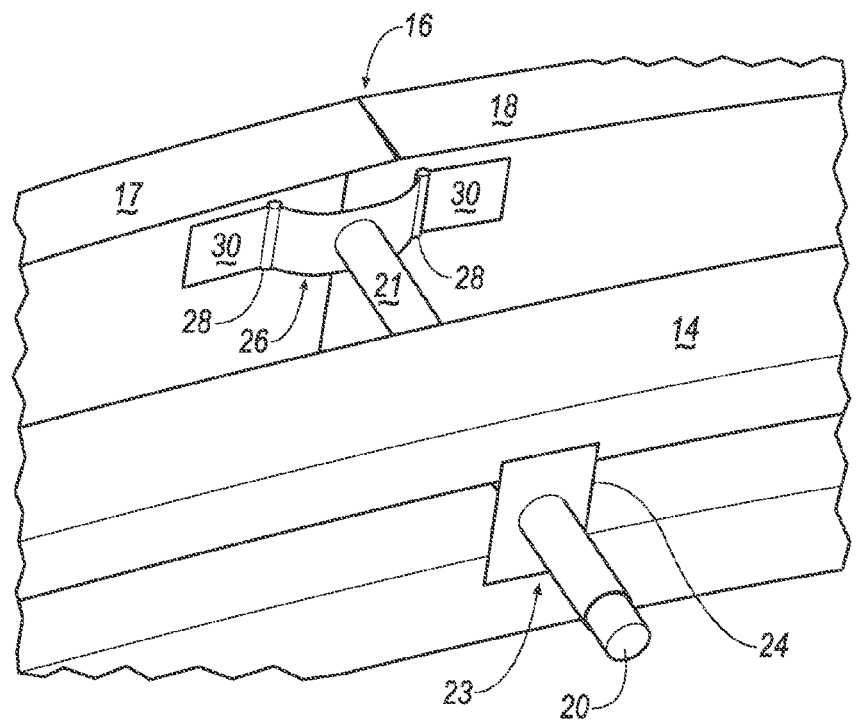
FIG. 6 is a perspective view of a center portion of the adaptive energy absorber system of FIG. 1 including a detail view of a linear actuator.
Figure 7:
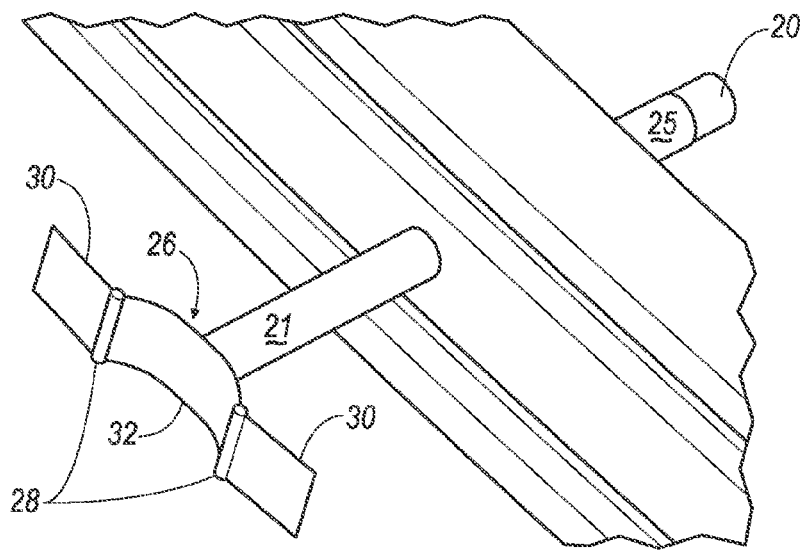
FIG. 7 is a perspective detail view of linear actuator including the actuator head bracket, and a vehicle bumper.

FIGS. 6 and 7 include detailed views of the linear actuator 20 as used in the system 10. An actuator flange 24 and an actuator threaded cylinder 25 form an actuator bumper fixture 23. The flange 24 may be affixed to the bumper 14 via a variety of securing mechanisms, e.g., welding or adhesion. An interior of the threaded cylinder 25 is threaded to correspond with threads provided on an actuator screw 21 threaded therethrough. The screw 21 is rotatably secured to a hinged head bracket 26. For example, the screw 21 could be provided with a lip or flange to secure the screw 21 to an opening in a head bracket center member allowing the bracket 26 to move toward and away from the bumper 14 in a direction of an axis of the screw 21.

Further, the securing mechanism of the screw 21, as just mentioned, allows the screw to rotate or turn with respect to the center member 32 of the bracket 26. The bracket 26 is further provided with side members 30 that are hingedly attached to the center member 32 via hinges 28. The side members 30, which, along with the center member 32, may be made of sheet metal or the like, are secured to the pieces 17, 18, respectively using a securing mechanism, e.g., welding. Accordingly, when the actuator 20 is used to affect motion of the energy absorber 16 toward or away from the bumper 14 in a direction of an axis of the screw 21, the hinges 28 and or flexibility of the center member 30 accommodate movement of the pieces 17, 18 with respect to one another.

For example, when the energy absorber 16 is moved toward the bumper 14, the pieces 17, 18 may move apart from one another, particularly on a side to which the members 30 are attached. The hinges 28, possibly along with flexibility in the center member 32, accommodates a change in a distance, e.g., the distance grows larger, between the two members 30. Likewise, when the energy absorber 16 is moved away from the bumper 14, the pieces 17, 18 may move toward one another until there is no gap between the pieces 17, 18 on a side to which the members 30 are affixed. Thus, the hinges 28 and/or flexibility of the center member 32 can accommodate the change in distance, e.g., the distance grow smaller, between the two members 30.

Figure 8:
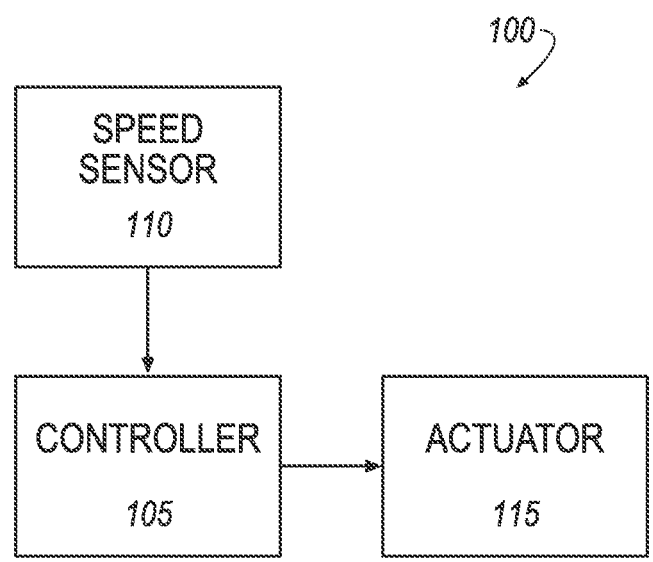
FIG. 8 is a block diagram of a vehicle bumper control system.

FIG. 8 is a block diagram of a vehicle bumper control system 100. The system 100 includes a controller 105 communicatively coupled to one or more actuators 115. The controller 105 generally includes a processor and a memory, the memory storing instructions executable by the processor. Further, the controller 105 may communicate on an in-vehicle network and/or communications mechanism, such as a controller area network (CAN) or the like. Accordingly, in addition to one or more actuators 115, the controller 105 may be communicatively coupled to one or more speed sensors 110. A speed sensor 110 may be any one of a number of known mechanisms for providing an indication of vehicle speed to the controller 105, e.g., as a CAN communication or the like. The actuator 115 shown in FIG. 8 is a generic representation of an actuator used to effect a change in an energy absorber system 10, e.g., the linear actuator 20 discussed above.

A process executed according to instructions stored in the memory of the controller 105 could include a step of, when a vehicle is in motion, using data from one or more speed sensors 110 to determine whether to deploy the bumper system 10 according to a low-speed scenario or a high-speed scenario, e.g., an LSD scenario or a pedestrian protection scenario. For example, a low-speed scenario could be identified when a vehicle was traveling at a speed of 15 kilometers per hour or less, while a high-speed scenario could be identified for any higher speed than this. In any event, upon identifying a scenario, the controller 105 could send a signal, e.g., a CAN communication, to an actuator 115 to move the energy absorber 16 to achieve a desired energy absorbing characteristic of the system 10. For example, the energy absorber 16 could be moved from a first state to a second state, and/or vice versa, as described above. Accordingly, in the event of an impact, the system 10 would provide appropriate energy absorbing characteristics for a speed of impact.

As used herein, the adverb "substantially" modifying an adjective means that a shape, structure, measurement, etc. may deviate from an exact described geometry, distance, measurement, etc., because of imperfections in materials, machining, manufacturing, etc.

In the drawings, the same reference numbers indicate the same elements. Further, some or all of these elements could be changed. Accordingly, it is to be understood that the above description is intended to be illustrative and not restrictive.

Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their ordinary meaning as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

The invention claimed is:

1. An energy absorption system, comprising:
   a vehicle bumper;
   an energy absorption member attached to the bumper, the energy absorption member comprising a first piece and a second piece; and
   a linear actuator connecting the energy absorption member to the bumper.

2. The system of claim 1, wherein motion of the linear actuator causes motion of the energy absorption member in at least one direction that is one of toward and away from the vehicle bumper.

3. The system of claim 1, wherein the linear actuator includes a screw and a bumper fixture having a threaded cylinder, the screw and the threaded cylinder being threadably mateable.

4. The system of claim 3, wherein the bumper fixture is secured to the bumper.

5. The system of claim 1, wherein the linear actuator includes a flexing mechanism.

6. The system of claim 5, wherein the flexing mechanism is a hinged head bracket.

7. The system of claim 6, wherein the hinged head bracket includes a center member and two side members, the center member having a screw of the linear actuator attached thereto, and the side members being secured to the energy absorption member.

8. The system of claim 1, wherein the first piece and the second piece of the energy absorption member each include a pair of securing tabs having an opening therein.

9. The system of claim 8, wherein the first piece and the second piece of the energy absorption member are respectively secured to the bumper by first and second pivot pins inserted through the tab openings and openings in the bumper.

10. The system of claim 9, wherein the tab openings are each arranged to allow each of the first and second pieces to move both pivotably and longitudinally with respect to the bumper upon actuation of the linear actuator.

11. The system of claim 1, wherein the first and second pieces are made from at least one of plastic and sheet metal.

12. The system of claim 1, wherein the bumper is made from steel.

13. The system of claim 1, further comprising a controller that includes a processor and a memory, the memory storing instructions executable by the processor, the instructions including instructions to determine a vehicle speed and, based on the vehicle speed, send a signal to actuate movement of the linear actuator to achieve a desired energy absorption characteristic.

14. The system of claim 1, wherein the system is installed on a vehicle.

15. A method, comprising:
   determining a vehicle speed; and
   based on the vehicle speed, sending a signal to actuate a movement of a linear actuator to achieve a desired energy absorption characteristic of an energy absorption system, the energy absorption system including a vehicle bumper, and energy absorption member attached to the bumper and having first and second pieces, wherein the linear actuator connects the energy absorption member to the bumper.

16. A controller including a processor and a memory, the memory and storing instructions executable by the processor, the instructions including instructions to:
   determine a vehicle speed; and
   based on the vehicle speed, send a signal to actuate a movement of a linear actuator to achieve a desired energy absorption characteristic of an energy absorption system, the energy absorption system including a vehicle bumper, and energy absorption member attached to the bumper and having first and second pieces, wherein the linear actuator connects the energy absorption member to the bumper.

\* \* \* \* \*